US011992779B2

(12) United States Patent
Magpuri et al.

(10) Patent No.: US 11,992,779 B2
(45) Date of Patent: May 28, 2024

(54) NETWORKED GAMES, RIDES AND ATTRACTIONS

(71) Applicant: Falcon's Beyond Brands, LLC, Orlando, FL (US)

(72) Inventors: Cecil D. Magpuri, Orlando, FL (US); Michael John Wallace, Orlando, FL (US); David Michael Schaefer, Orlando, FL (US); Syed Saham Ali, Orlando, FL (US); David James Consolo, Orlando, FL (US)

(73) Assignee: FALCON'S BEYOND BRANDS, LLC, Orlando, FL (US)

( * ) Notice: Subject to any disclaimer, the term of this patent is extended or adjusted under 35 U.S.C. 154(b) by 629 days.

(21) Appl. No.: 16/897,181

(22) Filed: Jun. 9, 2020

(65) Prior Publication Data
US 2020/0298133 A1 Sep. 24, 2020

Related U.S. Application Data

(63) Continuation-in-part of application No. PCT/US2019/019775, filed on Feb. 27, 2019, which
(Continued)

(51) Int. Cl.
*A63G 25/00* (2006.01)
*A63F 13/46* (2014.01)
(Continued)

(52) U.S. Cl.
CPC .............. *A63G 25/00* (2013.01); *A63F 13/46* (2014.09); *A63F 13/798* (2014.09); *A63F 13/80* (2014.09);
(Continued)

(58) Field of Classification Search
CPC .......... A63G 7/00; A63G 25/00; A63G 31/00; A63G 31/16
(Continued)

(56) References Cited

U.S. PATENT DOCUMENTS 5,906,542 A * 5/1999 Neumann ............. A63F 9/0291
463/52
6,179,619 B1 1/2001 Tanaka
(Continued)

FOREIGN PATENT DOCUMENTS

CN 202715234 U 2/2013
KR 20170102758 A 9/2017

OTHER PUBLICATIONS

International Search Report and Written Opinion for International Application No. PCT/US2019/019775; dated Jun. 13, 2019; 12 pages.

*Primary Examiner* — Kien T Nguyen
(74) *Attorney, Agent, or Firm* — KATTEN MUCHIN ROSENMAN LLP

(57) ABSTRACT

Various types of entertainment venues, including theme or amusement parks, game arcades, and similar venues are improved by providing a local server exchanging data with a cloud server. The local server controls and communicates with game or entertainment elements at the venue. The game or entertainment elements may be games at the location, input devices used by participants, such as smart phones, and/or audio and video devices. The cloud server controls and communicates with off-site elements. The cloud server and local server may communicate and synchronize data over the internet. The entertainment venue consequently can provide varying and evolving experiences through gamification.

18 Claims, 6 Drawing Sheets

Related U.S. Application Data is a continuation of application No. 15/910,915, filed on Mar. 2, 2018, now abandoned.

(60) Provisional application No. 62/859,521, filed on Jun. 10, 2019, provisional application No. 62/760,809, filed on Nov. 13, 2018.

(51) Int. Cl.
*A63F 13/798* (2014.01)
*A63F 13/80* (2014.01)
*A63G 7/00* (2006.01)
*A63G 31/00* (2006.01)
*A63G 33/00* (2006.01)

(52) U.S. Cl.
CPC ............... *A63G 7/00* (2013.01); *A63G 31/00* (2013.01); *A63G 33/00* (2013.01)

(58) Field of Classification Search
USPC ................................. 472/43, 59, 60, 61, 130
See application file for complete search history.

(56) References Cited

U.S. PATENT DOCUMENTS

| | | |
|---|---|---|
| 6,220,965 B1 * | 4/2001 | Hanna ...................... A63G 7/00 |
| | | 463/52 |
| 6,224,491 B1 | 5/2001 | Hiromi et al. |
| 6,386,984 B1 | 5/2002 | Hara et al. |
| 6,796,908 B2 * | 9/2004 | Weston .................... A63G 7/00 |
| | | 472/60 |
| 8,831,840 B2 | 9/2014 | Klappert et al. |
| 9,540,832 B2 | 1/2017 | Magpuri |
| 2006/0293110 A1 | 12/2006 | Mendelsohn |
| 2013/0244801 A1 | 9/2013 | Frolov |
| 2015/0190726 A1 | 7/2015 | Frolov |
| 2016/0089610 A1 | 3/2016 | Boyle et al. |
| 2016/0346704 A1 | 12/2016 | Wagner |
| 2019/0388794 A1 * | 12/2019 | Zavesky ................. G06F 3/011 |

* cited by examiner

NETWORKED GAMES, RIDES AND ATTRACTIONS

TECHNICAL FIELD

This Application claims priority to U.S. Provisional Application No. 62/859,521 filed Jun. 10, 2019. This Application is a Continuation-In-Part of International Application No. PCT/US2019/019775 filed Feb. 27, 2019 and which claims priority to U.S. patent application Ser. No. 15/910,915 filed Mar. 2, 2018, and to U.S. Provisional Application No. 62/760,809 filed Nov. 13, 2018. These Applications are incorporated herein by reference.

The field of the application is rides, theater presentations and themed and game attractions as often provided in theme or amusement parks or game arcade-type locations.

BACKGROUND OF THE INVENTION

Various theme park rides, shows, game locations and other attractions, collectively referred to here as attractions, have been created to provide guests with unique experiences. In ride attractions, guests typically sit in a vehicle that travels along a fixed indoor or outdoor path or track. In theater-type attractions, guests watch moving images on a screen, with or without live actors and/or special effects. Various walk-through attractions with thematic show elements and/or moving props and live actors, have also been widely used. Arcade-type attractions typically have large numbers of individual video games, pinball machines, dance games, shooting games, etc. In these types of conventional attractions, the guest experience is largely fixed. The guest generally sees, hears and feels the same thing with each visit to the attraction. The guest also is also necessarily a passive observer or player and has no input into any aspect of the attraction. These factors may tend to reduce the excitement or enjoyment of the attraction over time.

As one example, rides have been built with multi-passenger vehicles that travel along a fixed path and allow guest to shoot at real targets in the physical environment or at virtual targets in a virtual reality space. Independently, mobile gaming has evolved to allow players to create virtual characters and upgrade them through accomplishments, in-games purchases, or other rewards, providing an ever-changing gaming environment. Combining gaming features with a ride allows guests to compete in games of skill, with added excitement created by the movement of the vehicle, or of a motion base supporting seating on the vehicle. Although a repeat rider may be familiar with the general path of the ride, the gaming aspect may create interest during second and subsequent rides.

However, regardless of such enhancements to these passenger vehicle rides, repeat riders may over time feel the ride experience is no longer interesting or exciting. Accordingly, there is a need for an improved attractions and systems that can offer new effects and enhanced experiences.

BRIEF STATEMENT OF THE INVENTION

In one aspect, a method for operating an attraction includes receiving an input selection from a guest relating to a characteristic of the attraction. The guest is assigned a viewing position, an active prop, a seat or a vehicle of the attraction. The attraction is then operated with the input selection influencing the characteristic of the attraction as perceived by the guest. Generally, this may be performed by accessing a previously created profile of the guest stored in a memory. The profile may be changed by the current input selection made by the guest, with the changed profile stored for the guest's subsequent visit to, or participation in, the attraction. Guests may make their input selections using an app on their mobile phone, or by accessing a website of the attraction. Alternatively, guests may use an input device at the attraction, such as a kiosk, at the attraction venue.

In another aspect of the invention, a guest is assigned to a vehicle that moves in the attraction and the characteristic of the attraction changed by the guest's input selection is at least one of a path of the vehicle, a motion profile of the vehicle, a special effect created proximate to the vehicle, on-screen visual content, and/or a scoring characteristic of a game element used by the guest. The motion profile of the vehicle may include the velocity and acceleration or braking of the vehicle at selected locations along the path, and/or movements of a motion base (such as pitch, roll, yaw) on the vehicle supporting the seats in the vehicle.

In a separate aspect, an overlay control system for an experience such as an attraction, ride, live event, activity, touchpoint, venue or app includes a first communication link between the experience's elements and a controller, and a second communication link between the controller and a user's smart phone or a kiosk used by the user. The controller is adapted to modify at least one characteristic of the experience based on an input selection made by the guest. The overlay control system may be added to an existing underlying local control system, for example, the local control system that controls a ride, attraction, or arcade-types of games. The present control system may also be provided as stand system provided as original equipment of a park, attraction or arcade.

The overlay control system allows a user to create a custom profile, which can then be used as an identity. The custom profile may include an avatar selected by the user. This identity system allows for metrics that are generated, stored and updated from each use, and later retrieved to provide custom and dynamic outcomes in the same or different use activity. These metrics can also be used to accrue points or other digital currencies within the activity's economy. Redemption can be both hard and soft and can be accomplished via customizations to the character profile, fast passes, food and beverage, prizes or even customized content in activity. Items for redemption can be both physical or digital. Physical can include food and beverage or prizes, while digital can be currency, upgrades, and limited-edition content only obtainable by engaging with the activity. These metrics can then be used to further personalize ongoing activities not only onsite, but at the user's home, or anywhere they carry their phone or personal device.

A networked gaming ride system combines elements of electronic gaming with elements of a theme park ride, to provide both custom gaming and custom rider experiences. The present networked gaming ride attraction uses a unique set of steps to connect a mobile gaming platform with a ride experience, allowing the gaming and ride aspects to influence each other. As riders visit the ride attraction, their mobile gaming experience may be improved via enhanced gaming features, points, or power. And conversely, as mobile gamers play the game, their on-ride experience can be improved with additional features, points, or power. The combination of these gaming and ride elements may provide an ever-changing ride and gaming platform.

In another aspect relating to multiple types of entertainment venues, including theme or amusement parks, game arcades, virtual reality and augmented reality entertainment venues, electronic and video gaming venues, including laser tag, paint ball and similar venues, a local server exchanges data with a cloud server. The local server controls and communicates with game or entertainment elements at the on-site location. The game or entertainment elements may be games at the location, input devices used by participants, such as smart phones, and/or audio and video devices. The remote server controls and communicates with the user's phone or appliance. The remote server and local server may constantly communicate and synchronize data over the internet. Together this ecosystem transforms traditional entertainment experiences into ongoing, evolving experiences through gamification, connection with guests, analytics, and other features. In the discussion below the various types of parks, arcades, games and venues described above are collectively referred to as an attraction.

BRIEF DESCRIPTION OF THE DRAWINGS

These and other features, aspects, and advantages of the present disclosure will become better understood when the following detailed description is read with reference to the accompanying drawings wherein the same element number indicates the same element in each of the views.

DETAILED DESCRIPTION

Figure 1:
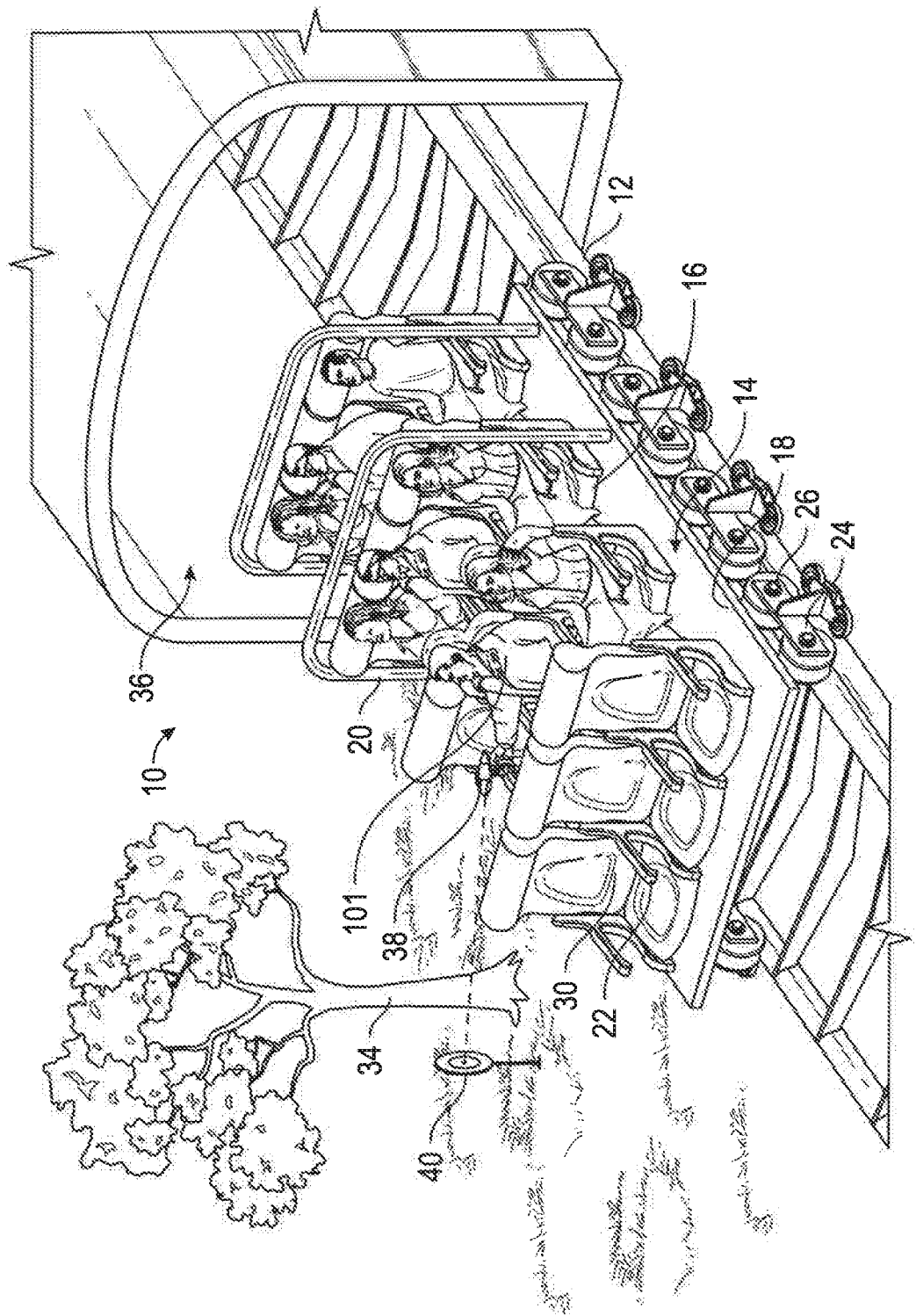
FIG. 1 is a perspective view of a ride attraction.

As shown in FIG. 1, a ride attraction 10 has a path or track 12, with vehicles 14 movable along the track 12. Seats 16 of the vehicle are attached to a floor or seating platform 18 which optionally is supported on a motion base 26, such as a flight simulator type of motion base 26. The motion base 26 is attached to a chassis 24 typically having wheels which roll on a path or track 12, although the vehicle may optionally be suspended from an overhead track, float on water, or use other support techniques such as magnetic-levitation, hover, etc. In some designs the vehicle may be designed to carry standing riders. The path or track 12 may be indoors to provide a dark ride, or be outdoors to provide a coaster type of ride, or include elements of both. Stationary, moving or animatronic figures, scenery and creative elements 34, may be provided along the path or track 12. The path or track 12 may also pass through un-themed space 36.

The riders or guests 101 may be provided with objects or props 38, such as magical wands, canes, gloves, etc., or fictional weapons such as ray guns, so-called phasors or similar objects, generally matching a specific storyline, such as a storyline from a movie, comic book, novel, etc. These objects 38 may be active in the sense that the ride system can detect whether a rider using the object has acquired or hit an intended target 40. The intended target may be a real fixed or moving robotic target, or a projected or virtual character or inanimate target. The objects 38 may also provide sound, vibration and/or visual effects when activated by a rider.

Figure 2:
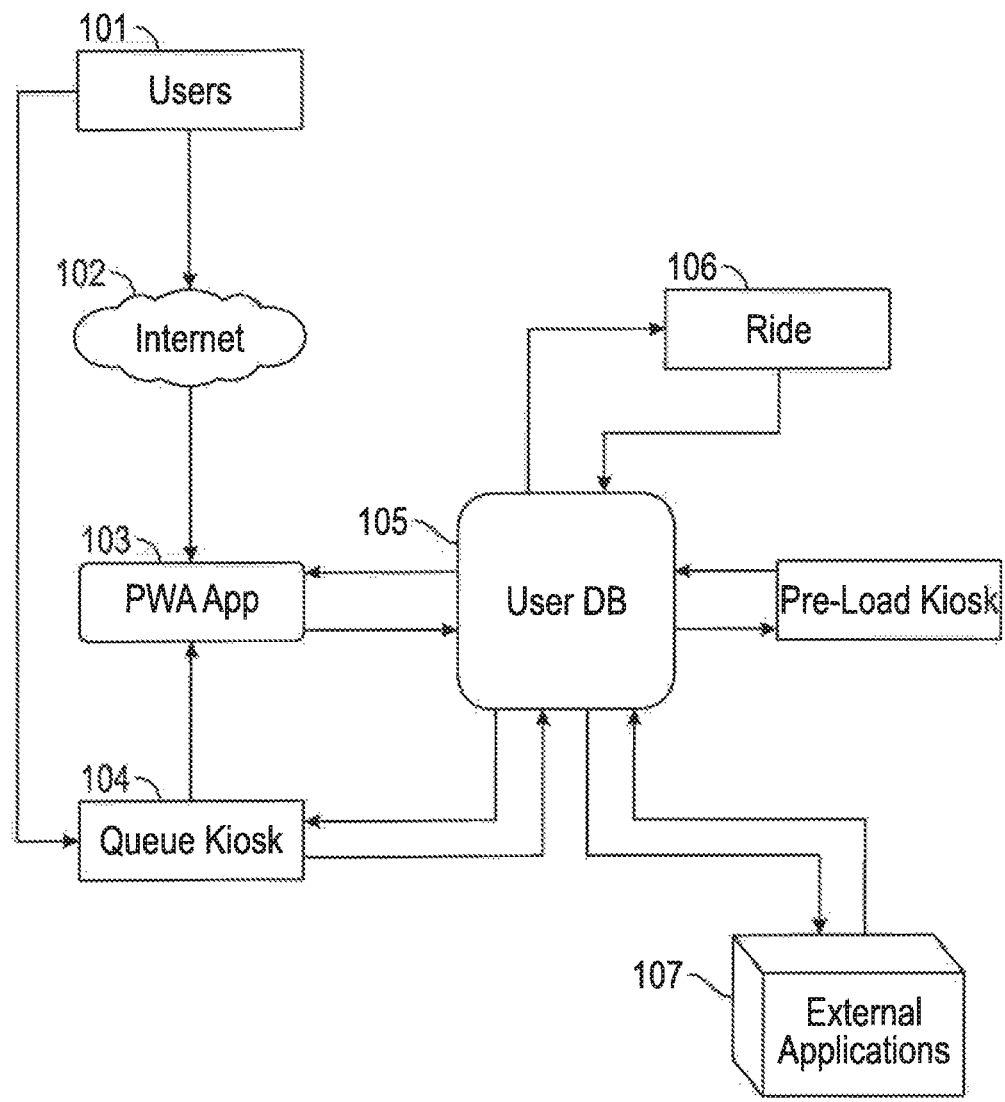
FIG. 2 is a diagram illustrating operation of a network gaming ride attraction.

Turning to FIG. 2, in operation riders 101 access the ride system 110 either through their smart phones (i. e, via the internet 102) or from a queue kiosk 104 while the riders are in the ride queue. From here riders have access to a rider or guest database 105 to create and modify their in-game character. Riders then board a ride vehicle 14, for example in the ride 106 shown in FIG. 1. The ride 106 may have themed elements such as scenery 34 and targets 34 matching those of a mobile game played on a smart phone. Once on the ride vehicle 14, the ride system pulls information from the database 105 and returns results back to the same database 105. After a rider completes the ride, the system records that the rider completed ride (i.e., adding to the rider's ride count) and also records the rider's score in the database 105. The system may then unlock features in the mobile game or other in-park rewards (such as a front-of-the-line pass, merchandise discounts, etc.). External applications 107, such as additional mobile bases, can alternatively be used to access guest data from the database 105 and return information as riders increase their scores, or abilities. A pre-load kiosk 108 may be used to assign each rider to a specific seat or position in a specific ride vehicle 14. Seat assignment may optionally be performed without a pre-load kiosk, for example with the ride system 110 providing each rider with an electronic boarding pass, or in other ways.

Each individual rider's on-ride experience may be enhanced via software. Typically the enhanced features vary depending on the storyline and installation site. For example, riders reaching a higher level of a game, or riders earning a higher score may be provided with a more powerful magic wand or weapon. Ride effects may also be changed, such as lighting effects (strobes, lasers, etc.) appearing when a rider obtains a specified point score. Similarly, other enhancements may include special effects such as fog, wind, water spray, etc. or onscreen animation and/or character actions and dialog.

The ride path, special effects, onscreen graphics, etc. may be customized or specifically made for each specific rider. This may be achieved via the riders wearing a virtual reality headset or googles. Alternatively, some of the enhancements can be more group or vehicle based (special effects for example) with others made more personal such as a result from hitting a target. A vehicle may include various quantity of riders with different character attributes, so their powers appear differently, to help distinguish each rider's gameplay from adjacent riders in the same vehicle. For example, each rider's object 38 may emit light of a specific color or character.

As used here, smart phone includes equivalent devices such as laptops, tablets, phablets, etc. Path means a physical path, such as a track, as well as a virtual path, such as an instruction set saved in a memory.

Figure 3:
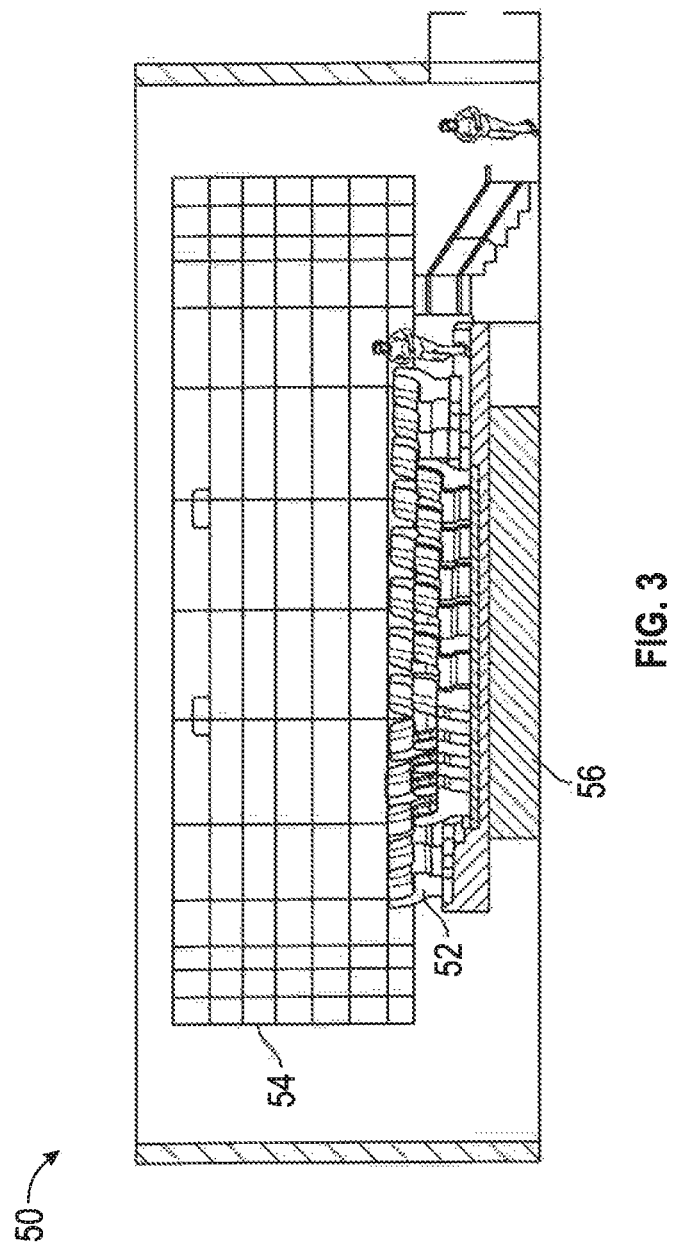
FIG. 3 is side view of a theater-type attraction.

FIG. 3 is a side view of a theater-type attraction 50 which typically has moving images displayed in front of a forward-facing audience, or in the example shown, with the audience on seating 52 facing radially inwardly or outwardly towards a surrounding screen 54. The theater type attraction 50 may be designed for example as described in U.S. Pat. No. 9,540,832, incorporated herein by reference. The seating 52 may be supported on a motion base or turntable 56. The principles of the invention apply to these and other types of attractions as well, including walk through attractions, attractions using virtual reality or augmented reality, tour-type attractions, and attractions having live actors.

Regardless of the specific type of attraction, before entering or boarding the actual attraction, guests may queue up in a free-roam queue or pre-show area 106 (or series of rooms) where guests are able to wait for their allotted attraction time, explore a themed environment thematically tied to the attraction narrative, and/or also learn how to create and change their profile to vary the attraction experience. Interactive terminals and mini-games that feature the same interactive methods used in the attraction may be provided in the queue or pre-show areas, which may alternatively be outdoors.

Figure 4:
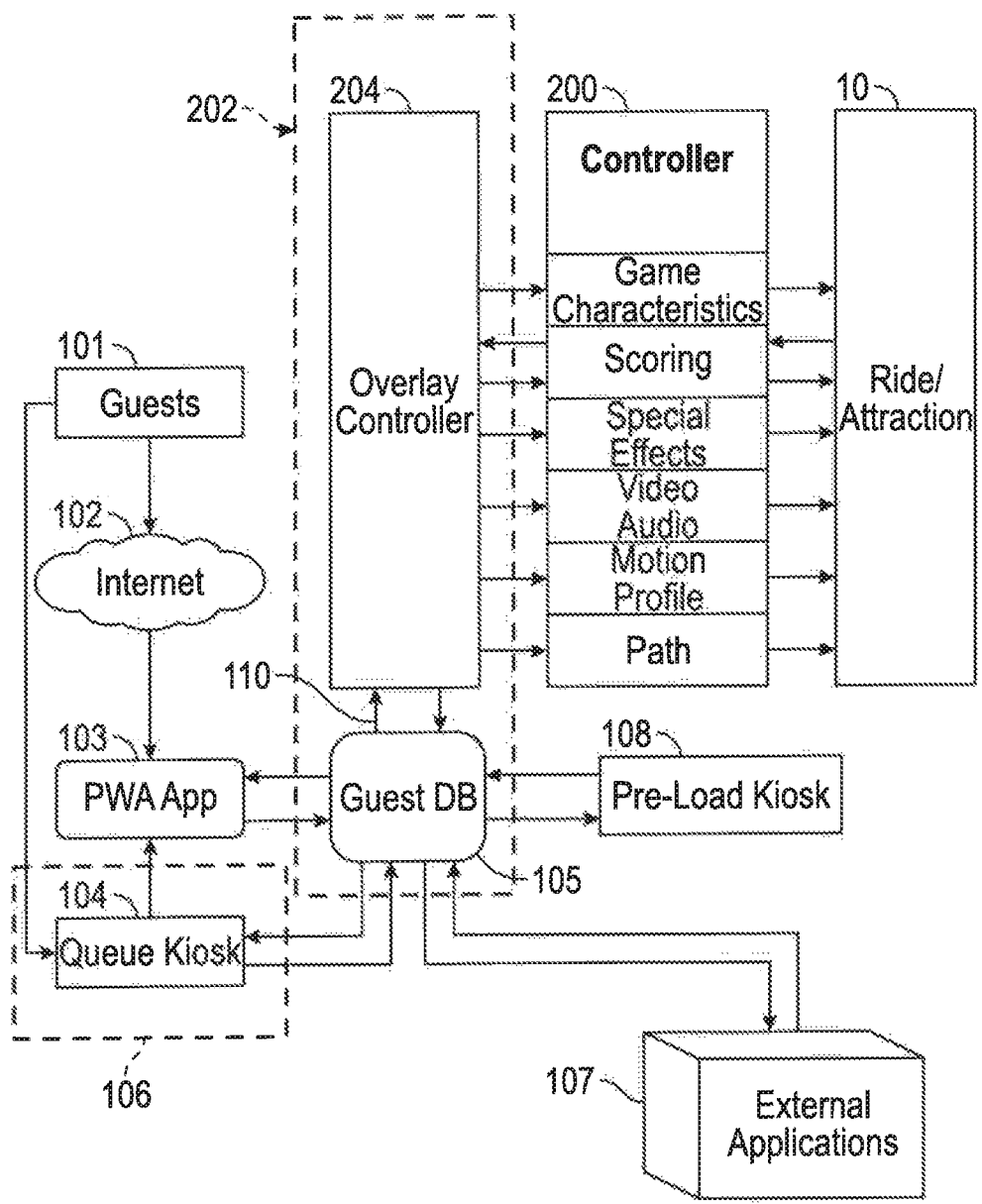
FIG. 4 is a diagram illustrating operation of an attraction overlay control system.

In the attraction overlay system of FIG. 4, guests or riders 101 access the system 202 either through their smart phones (i. e, via the internet 102) or from a queue kiosk 104 by checking in or logging in using a personal identifier, e.g., password, fingerprint, voice print, retina scan, smart phone proximity, etc. The guests may check in while in the attraction queue area 106, or elsewhere remote from the attraction. Upon checking in the overlay system 202 retrieves the guests profile from memory in the database 105. The guest's profile contains information about the guest's preferences, and optionally past attraction experiences. The overlay system 202 then loads the guest's profile into the attraction controller 200, or into a separate overlay controller 204, if used, so that the guest's upcoming attraction experience is modified to better fit the guest's profile. The modifications may involve selecting the guest's role or character in the attraction, varying the speed and intensity of the attraction, selecting the type and timing of visual and sound effects, or changing the ease or difficulty of gaming elements and game mechanics.

In creating or altering their profile, guests may select custom characters (or avatars) for themselves to enrich their attraction or game experiences. This may also involve allowing the guest to unlock new tools, abilities, aesthetics, and lore to use and enjoy on repeat experiences. Additionally, the rewards and outcomes of each attraction experience for each guest may be added to the guest's profile.

After checking in, the guest enters the attraction, or in the example of FIG. 1, boards a ride vehicle 14. Characteristics of the attraction are modified based on the guest's profile. The park operator may use an external applications module 107 to monitor or change guest profiles stored in the database 105, to provide messaging with guests, and for other functions. A pre-load kiosk 108 may be used to assign each guest to a specific seat or position in an attraction or a specific ride vehicle 14. Seat assignment may optionally be performed without a pre-load kiosk, for example with the overlay control system 202 providing each guest with an electronic boarding pass, or in other ways.

Referring still to FIG. 4, an existing conventional ride or attraction 10 is controlled by the attraction controller 200. The attraction controller 200 is typically pre-programmed with parameters that control various aspects of the attraction 10, which may include game characteristics, scoring, special effects, video/audio, motion base motion profiles, vehicle paths and movement profiles. The attraction controller may also handle other functions such monitoring sensors, performing load/unload functions, lighting, environmental elements, etc. The overlay system 202 may be retrofitted onto the controller 200, or provided as an integral component of a purpose-built attraction. In many applications the overlay system 202 may be provided as a software supplement to the controller 200. In this case no additional hardware may be needed, other than input devices, if used, such as the progressive web application (PWA) 103, the queue kiosk 104, the pre-load kiosk 108, and the external applications module 107. In other applications, the overlay system 202 may be provided as a separate controller 204 as shown in FIG. 4, which interfaces with the computer controller 200, or directly with the attraction 10.

In FIG. 4 the guest database 105 is shown as a separate element (such as cloud storage) connected to the overlay controller 204 via communication links 110. Optionally, the guest database 105 may be included in the overlay controller 204.

At pre-determined points during the ride, the guest's performance or score can change operation of the attraction, influencing elements such as scene selection, varying a storyline, and/or changing a vehicle ride-profile or motion base movements. The overlay system 202 may also allow guests to change the attraction operation based on collective decisions with other guests that are made via voting or the outcome of their collective performance in a particular scene or throughout the entire attraction. Use of the overlay 202 may promote a sense of community in which large groups of people are empowered to collaborate and/or compete as a team.

The ride path or attraction movements, special effects, onscreen graphics, etc. may be customized or specifically made for each specific guest. This may be achieved via the guests wearing a virtual reality headset or googles. Alternatively, some of the enhancements can be more group or vehicle based (special effects for example) with others made more personal such as a result from hitting a target. A vehicle may include various quantity of guests with different character attributes, so their powers appear differently, to help distinguish each guest's gameplay from adjacent guests in the same vehicle.

After completing the attraction experience, guests can use terminals or their own mobile devices to explore and interact with the outcome of their experience. A guest's gaming statistics, customizations, awards, credits, rewards etc. may be fed back into the cloud or local webserver/DB guest profile allowing guests to access their accounts from any internet connected device.

The overlay system 202 encourages repeated guest engagement. The overlay system 202 may also provide guests with a method for comparing their own performance or results in the attraction to the performance or results of other guests in the same attraction event, a different attraction event at the same venue, or a different attraction event at a different geographic location.

With the overlay 202 storing and tracking the guest's profile and venue activities, the overlay 202 causes the guest's profile to evolve in real-time with each accumulated visit to the attraction and/or access of the guest's profile on line. The successes, choices, and rewards that a guest earns are maintained in the guest's profile. This can allow the guest to feel a tangible sense of ownership in the attraction experience. Moreover, with the overlay system 202 storing and updating the guest's profile each time the guest rides, participates in or views the attraction, the profile data may allow the guest to earn physical rewards from in and around the attraction, including real or virtual prizes, discounts, promotional deals, VIP attraction passes, and special retail souvenirs.

For attractions involving scoring, high-score leaderboards in the park may visibly showcase guest's scoring. High-Scores may be awarded to individual guest avatars or collectively grouped factions from a storyline. The cumulative progress of a guest's individual avatar or of each global faction may then also be reviewed before and/or after visiting the attraction via an internet browser or mobile device. Guest refers to a person riding, using or experiencing the attraction. Rider refers to a guest using or experiencing a ride-type of attraction.

The methods described above may also be used at entertainment locations, such as game arcades having video games, such as shooting games, boxing, combat and fighting games, driving games, dance games, sports games, construction games, theme or amusement parks, virtual reality and augmented reality entertainment venues, electronic and video gaming venues, including laser tag, paint ball and similar venues, etc. These are referred to here as entertainment venues. Entertainment venue data means data provided at the entertainment venue, such as data entered by a participant, data recorded by, and provided from a game or entertainment apparatus, participant scores, times, actions, money spent or won, etc. In the example shown the attraction 10 in FIG. 4 may be a game at an entertainment venue location. A game or app on the guest's smart phone (in the external applications 107 in FIG. 4) connects to the overlay controller 204 via a wifi or cellular link, to allow exchange of data. Alternatively, the guest may check-in with a specific individual game via a wireless radio or optical link, such as wifi or near-field communication. The attraction may also be a museum exhibit or similar display, with the exhibit modified based on the guest's character profile.

Figure 5:
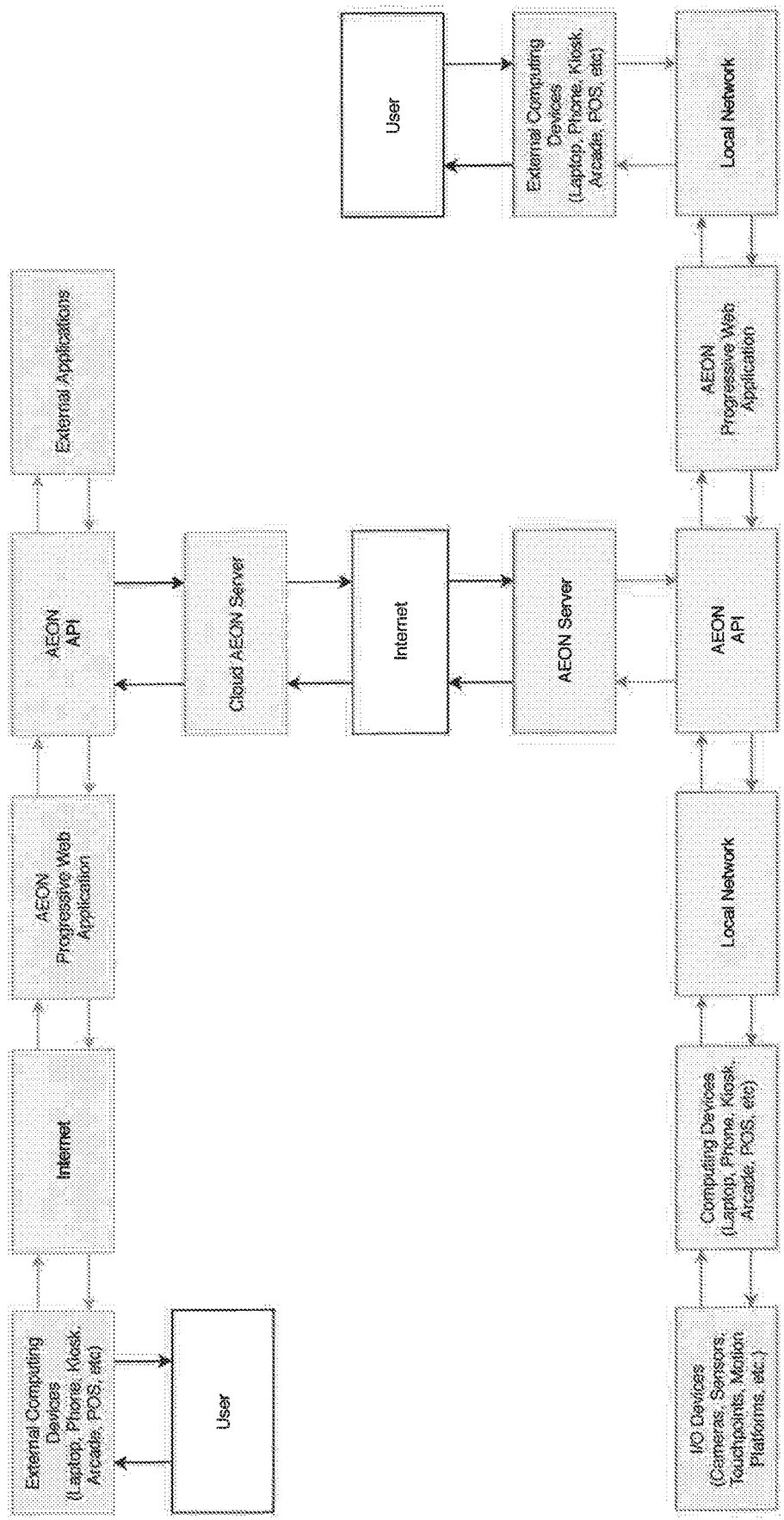
FIG. 5 is a diagram illustrating local and cloud server operations.

Referring to FIG. 5, a game system has two main parts, a local server and a cloud server. The local server, represented by the bottom half of FIG. 5, controls and communicates with game or entertainment elements at the on-site location. The cloud server, represented by the top half of FIG. 5, controls and communicates with off-site elements. The cloud server and local server are constantly communicating and synchronizing data over the internet. Together this ecosystem transforms traditional entertainment experiences into ongoing, evolving experiences through gamification, connection with guests and analytics. In FIG. 5 I/O devices represent the physical action or end result of operation of the system, such as lights turning on/off, graphic displays, sounds, etc.

Figure 6:
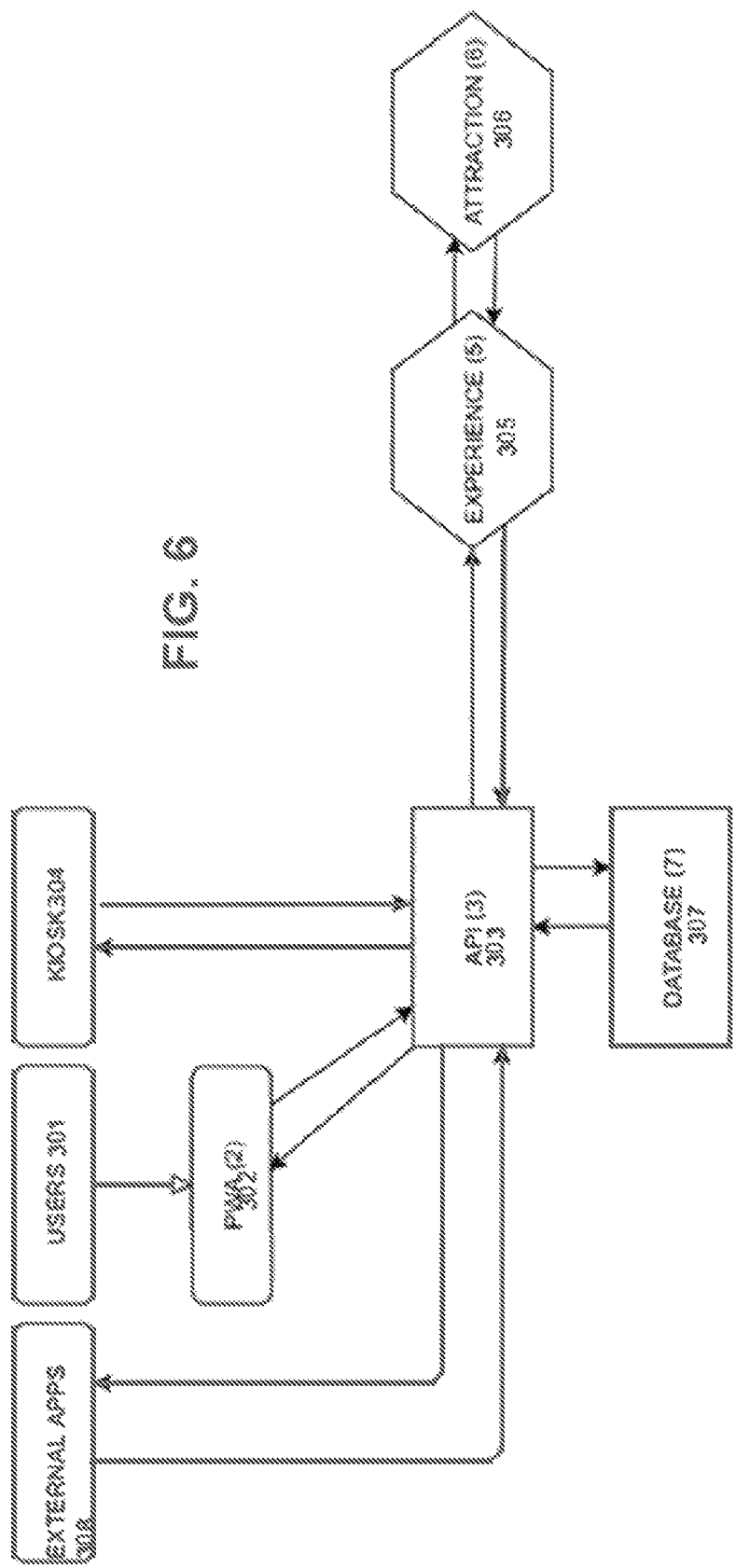
FIG. 6 is a flow chart of an embodiment of the invention.

In FIG. 6 showing a flow sequence of an embodiment of the present methods, a user 301 uses their device (phone, tablet, PC, Console etc.) to interface with the application 302 (progressive web application. web based game, mobile app, PC app, etc.). The application 302 directly communicates to the database 307 via a representational state transfer application programming interface (REST API) 303. When the user achieves, for example, points or an achievement in the application, that "value" is then sent to the API or user interface 303, which then securely commits it to the database 307.

When user physically visits the attraction 305 (attraction, arcade, location-based-entertainment, etc.), the user checks in via the kiosk 304 so the system is aware that the user 301 is now present. The user then can visit an attraction 306 within the physical confines of the experience location.

The user swipes in or logs in to the attraction. The attraction or experience receives the user data via the API 303 and selects the experience based on the users preferences or other profile parameters. Once the user 301 completes the experience, the data is sent back via the API 303 to the database 307. This data is then available to other touchpoints such as food and beverage 304 locations or other internal or external applications.

After the user has engaged with the experience the user can continue interacting with their profile outside or inside the venue via the PWA, further adjusting their profile. The profile will reflect all aspects that were modified from the visit to the experience.

A user can decide to change the color of their outfit in their profile, so when they go to the attraction, the character onscreen will actually have the outfit that was selected. Also, if the user gains something within the attraction, that item is now available to the user when they are at home via the PWA. External Apps 8 may include POS systems, Retail, redemption, or any other devices that support communicating via the API.

In an overlay control system, a first communication link is provided between a user experience and a computer controller at an attraction. A second communication link is provided between the computer controller and a user's smart device or kiosk used by the user. The computer controller creates, stores and modifies the user's custom profile based on metrics generated and stored during the user's participation in the attraction. The metrics may be used to create custom features, outcomes, or experiences for use onsite at the attraction. The metrics may be used to accrue points or other digital currencies redeemable for physical or digital rewards.

As used here, entertainment element means an elements of a ride, a game, a show or a live event.

Thus, novel systems and methods have been shown and described. Various changes and substitutions may of course be made without departing from the spirit and scope of the invention. The invention, therefore, should not be limited, except to the following claims and their equivalents.

The invention claimed is:

1. A method for operating an entertainment attraction, comprising:
   receiving a personal user identifier from a user;
   retrieving a previously created profile of the user, created by the user and modifiable by the user, from a computer memory, wherein the profile includes information on the user's traits relative to the attraction;
   loading elements of the user's profile into a fixed location entertainment attraction computer associated with the entertainment attraction computer;
   the entertainment attraction computer modifying at least one control instruction based on the elements of the user's profile; and
   changing a physical aspect of the entertainment attraction perceptible by the user, based on the modified control instruction.

2. The method of claim 1 further including changing a physical aspect of the attraction at a selected location of the attraction upon detecting the presence of the user at the selected location.

3. The method of claim 1 wherein the profile includes information on the user's preferences and/or past experiences with the attraction.

4. The method of claim 1 wherein the physical aspect is one or more of a ride path or attraction movements, a special effect, an onscreen graphic, and/or a point scoring characteristic.

5. The method of claim 4 wherein the special effect comprises fog, wind, water spray, a sound effect, a lighting effect, a shock or vibration effect, on screen animation and/or character actions and/or dialog.

6. The method of claim 1 wherein the user identifier is a fingerprint, voice print, or retina scan.

7. The method of claim 1 wherein the user identifier is a near field communication.

8. The method of claim 1 wherein the user identifier is provided by a smart phone.

9. The method of claim 8 wherein the smart phone operates only to provide the personal user identifier.

10. The method of claim 1 wherein the user identifier is a password.

11. A method for operating an entertainment attraction, comprising:
- receiving in an attraction computer at a fixed location substantially only a personal user identifier from a user;
- retrieving a previously created profile of the user, created by the user and modifiable by the user, from a computer memory associated with the attraction computer, wherein the profile includes information on the user's preferences and/or past experiences with the attraction;
- loading elements of the user's profile into the attraction computer;
- the attraction computer modifying at least one control instruction based on the elements of the user's profile; and
- changing a physical aspect of the entertainment attraction perceptible by the user, based on the modified control instruction.

12. The method of claim 11 wherein the user only provides an identifier to the attraction computer.

13. A method for operating an entertainment attraction, comprising:
- providing only a personal user identifier into an attraction computer;
- retrieving a previously created profile of the user, created by the user and modifiable by the user, from a computer memory linked to the attraction computer, wherein the profile includes information on one or more of the user's past experience with the entertainment attraction;
- loading elements of the user's profile into the attraction computer;
- the attraction computer modifying at least one control instruction based on the user's past experience with the entertainment attraction; and
- changing a physical aspect of the entertainment attraction perceptible by the user, based on the modified control instruction, wherein the control instruction is performed entirely by the attraction computer after receiving the user identifier.

14. The method of claim 13 wherein the user identifier is a fingerprint, voice print, or retina scan.

15. The method of claim 13 wherein the user identifier is a near field communication.

16. The method of claim 13 wherein the user identifier is provided by a smart phone.

17. The method of claim 16 wherein the smart phone operates only to provide the user identifier.

18. The method of claim 13 wherein the user identifier is a password.

* * * * *